United States Patent [19]

Petit

[11] Patent Number: 4,999,154
[45] Date of Patent: Mar. 12, 1991

[54] DEMOUNTABLE FUEL ASSEMBLY FOR A NUCLEAR REACTOR COOLED BY LIGHT WATER

[75] Inventor: Bernard Petit, Saint Genis Laval, France

[73] Assignees: Framatome, Courbevoie; Cogema, Velizy Villacoublay, both of France

[21] Appl. No.: 409,185

[22] Filed: Sep. 19, 1989

[30] Foreign Application Priority Data

Sep. 19, 1988 [FR] France ............................ 88 12213

[51] Int. Cl.$^5$ .............................................. G21C 3/32
[52] U.S. Cl. .................................. 376/446; 376/353; 376/449
[58] Field of Search ........................ 376/446, 449, 353

[56] References Cited

U.S. PATENT DOCUMENTS

| 4,617,171 | 10/1986 | Feutrel | 376/446 |
| 4,631,168 | 12/1986 | Shallenberger | 376/446 |
| 4,641,409 | 2/1987 | Shallenberger | 376/446 |
| 4,684,498 | 8/1987 | Paul | 376/446 |
| 4,688,416 | 8/1987 | Shallenberger | 376/446 |
| 4,699,758 | 10/1987 | Shallenberger | 376/446 |
| 4,699,760 | 10/1987 | Shallenberger | 376/446 |
| 4,738,821 | 4/1988 | Shallenberger | 376/446 |

FOREIGN PATENT DOCUMENTS 0098774 1/1984 European Pat. Off. .
0140588 5/1985 European Pat. Off. .
0196610 10/1986 European Pat. Off. .

Primary Examiner—Donald P. Walsh
Attorney, Agent, or Firm—Pollock, Vande Sande & Priddy

[57] ABSTRACT

The guide tube (4) is fixed inside the adapter plate (10) of the demountable end block by a locking sleeve (20). The locking sleeve (20) comprises a part (24) ensuring expansion of the tube (4) and a ferrule (25) for fixing in the adapter plate (10). The fixing ferrule (25) consists of cylindrical segments separated by slits arranged in the direction of the generatrices of the ferrule (25). The cylindrical segments have deformations (29) inside cavities (22) radially directed relative to the through-hole (11) of the adapter plate (10), for ensuring fixing of the sleeve (20). The cylindrical segments of the ferrule (25) can be folded inwards so as to disengage the deformations (29) from the cavities (22), before extraction of the sleeve (20), in order to carry out demounting of the connection of the guide tube (4) and the adapter plate (10).

6 Claims, 4 Drawing Sheets

DEMOUNTABLE FUEL ASSEMBLY FOR A NUCLEAR REACTOR COOLED BY LIGHT WATER

FIELD OF THE INVENTION

The invention relates to a demountable fuel assembly for a nuclear reactor cooled by light water and in particular for a reactor cooled by pressurized water.

BACKGROUND OF THE INVENTION

Water-cooled nuclear reactors and in particular pressurized-water nuclear reactors comprise assemblies consisting of a bundle of fuel rods of considerable length, arranged parallel to each other and held inside a framework formed by guide tubes, struts and two end blocks. The guide tubes are arranged in the longitudinal direction of the assembly and are connected to transverse struts regularly spaced along the length of the assembly.

The guide tubes are also connected at each of their ends to one or other of the two end blocks forming parts for rigidifying and closing the assembly.

The fuel rods of the assembly form a bundle in which the rods are parallel to each other and arranged, in the transverse sections of the assembly, in a regular latticework determined by the struts. Certain positions of the latticework are occupied by guide tubes which are generally rigidly connected to the struts.

The guide tubes have a length greater than the length of the fuel rods and are positioned inside the bundle, so as to comprise a part projecting relative to the bundle of fuel rods at each of their ends. The end blocks are fixed onto these projecting parts of the guide tubes so as to ensure closure of the assembly at each of its ends.

The fuel rods consist of sintered pellets of nuclear fuel material stacked inside a metal sheath isolating the pellets from the fluid surrounding the fuel assembly. In the event of rupture of a sheath of a fuel assembly rod, this rod must be replaced very rapidly in order to avoid leakages of radioactive product into the cooling fluid of the reactor. In order to gain access to the fuel rods and carry out replacement thereof, one of the end blocks of the assembly must be demounted, which assumes the elimination of the connections between the corresponding ends of the guide tubes and the end block.

The end blocks comprise through-holes reproducing the latticework of the guide tubes, in each of which a guide tube is engaged and fixed.

To permit replacement of defective rods in the fuel assemblies new fuel assemblies have been designed and developed, comprising guide tubes, the connection of which with at least one of the end blocks is demountable.

In order to carry out replacement of the defective fuel rods, the assembly is placed under water in the vertical position, inside a well such as a storage well; the assembly rests on the bottom of the well via one of its end blocks or bottom end block. The other end block or top end block is accessible at a certain water depth from the top of the well.

In a known type of demountable fuel assembly, the parts of the guide tubes engaged in the top end block of the assembly comprise a radially expandable part which may be, for example, mounted on the end of the guide tube. This expandable part may consist of a slitted bush having a part radially projecting outwards which is intended to be accommodated inside a cavity of corresponding shape machined inside the end block, in the through-hole of the guide tube. A locking sleeve introduced inside the guide tube effects radial expansion of the slitted bush and securing of the guide tube, the radially projecting part of which is accommodated inside the cavity machined in the end block.

Only a certain length of the guide tube is engaged in the hole passing through the adapter plate of the end block, the remaining part of the hole, above the guide tube, emerging on the upper surface of the adapter plate of the end block.

A demountable connection for the guide tube of a fuel assembly of the type described above is known, comprising a locking sleeve having a bush ensuring expansion of the guide tube extended axially by a fixing ferrule which is accommodated, when the locking sleeve is arranged in position inside the guide tube, in the part of the hole situated above the guide tube and emerging on the upper surface of the adapter plate. Radial cavities are provided in this part of the hole of the adapter plate and the fixing ferrule is deformed, after arranging the locking sleeve in position inside the guide tube, such that the deformed parts of this fixing ferrule fit inside the cavities so as to achieve axial and rotational locking of the locking sleeve.

Effective fixing of the guide tube is thus obtained by means of operations which may be carried out, without difficulty, from the top of the assembly.

However, demounting of the guide tube requires that, initially, the locking sleeve which is held inside the end block by the fixing ferrule be extracted. This operation may be performed by a tool which is introduced into the sleeve and which comprises parts, movable in radial directions, which are positioned under the bottom end of the sleeve. A pulling force is exerted on the tool so as to allow the fixing ferrule to be unlocked and the sleeve of the guide tube to be extracted.

This operation of extracting the locking sleeve before demounting the top end block of the assembly requires the use of a complex tool and the application of pulling forces which are all the greater the more effectively the sleeve is fixed by means of the ferrule.

SUMMARY OF THE INVENTION

The object of the invention is therefore to propose a demountable fuel assembly for a nuclear reactor cooled by light water comprising a bundle of parallel fuel rods held inside a framework formed by guide tubes, struts and end blocks fixed onto the ends of the guide tubes, at least one of the end blocks being fixed onto one of the ends of each of the guide tubes in a demountable manner, by means of an end part of the guide tube deformable radially and having a securing part projecting radially outwards, engaged inside and over a part of the length of the hole passing through the end block and comprising, in its part receiving the guide tube, an annular enlargement intended to receive the securing part of the guide tube, radial expansion of the end of the guide tube and holding of its securing part inside the annular enlargement of the hole of the end block being ensured by a locking sleeve comprising a bush for expanding the guide tube and a ferrule for fixing in the end block projecting at the end of the guide tube in the locked position of the sleeve, inside the part of the hole of the end block not receiving the guide tube, which comprises at least one radial cavity inside which the fixing ferrule is deformed so as to ensure fixing of the locking sleeve, it being possible for this fuel assembly to be demounted very easily and comprising nevertheless sleeves for locking the guide tubes which are fixed in a very effective and resistant manner inside the demountable end block.

To this end, the fixing ferrule consists of at least two cylindrical segments separated from one another by at least two slits arranged in the direction of the generatrices of the fixing ferrule and the hole passing through the end block comprises at least one radial cavity coinciding with at least one of the cylindrical segments, in the locked position of the sleeve.

BRIEF DESCRIPTION OF THE DRAWINGS

So that the invention may be more clearly understood, a description now follows, by way of example, with reference to the appended drawings, of an embodiment of a demountable fuel assembly for a pressurized-water nuclear reactor, according to the invention.

DESCRIPTION OF PREFERRED EMBODIMENT

Figure 1:
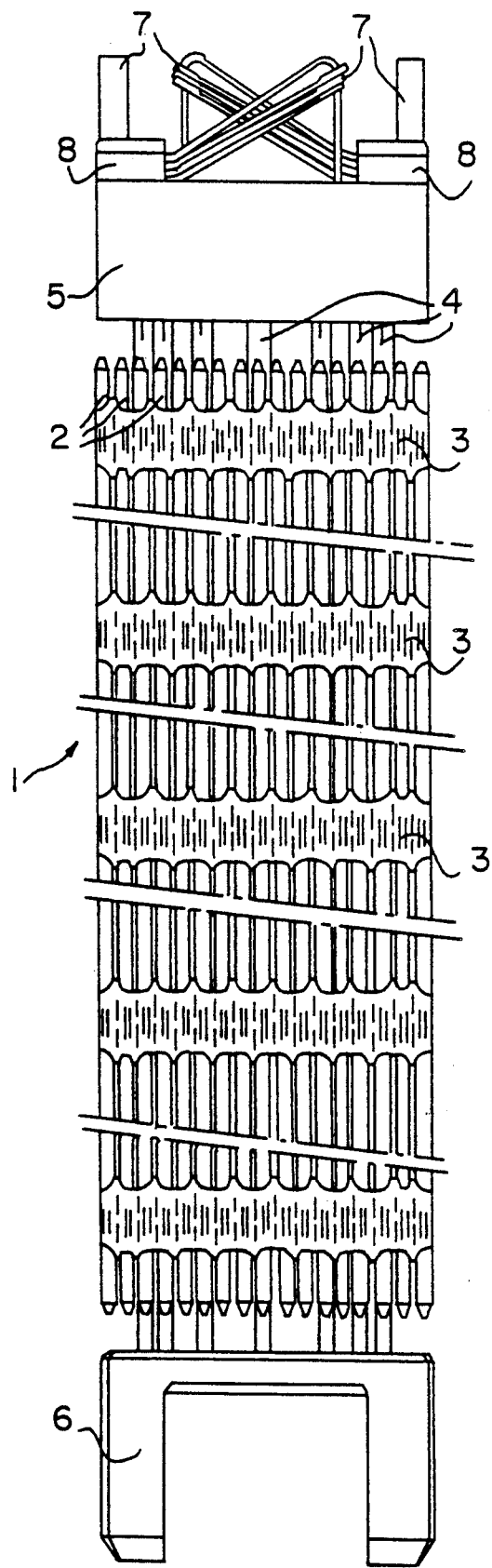
FIG. 1 is an elevation view of a fuel assembly of a pressurized-water nuclear reactor.

FIG. 1 shows a fuel assembly denoted generally by the reference 1 and consisting of a bundle of parallel fuel rods 2 held by struts 3 arranged with certain spacing along the length of the rods 2. The struts 3 consist of grids, the cells of which each receive a fuel rod. Certain positions in the latticework of the grids are occupied by guide tubes 4, the length of which is greater than the length of the fuel rods 2.

The guide tubes 4 are connected at one of their ends to an end block 5 forming the top end block of the fuel assembly and at their other end to a second end block 6 forming the bottom end block.

When the assembly is in the underwater storage position inside a well, the top end block 5 is accessible from the top of the well. This top end block 5 carries leaf springs 7 ensuring holding of the assembly inside the reactor core, the upper core plate of which rests on the springs 7. The end block also comprises studs 8 projecting relative to its upper surface.

Figure 2:
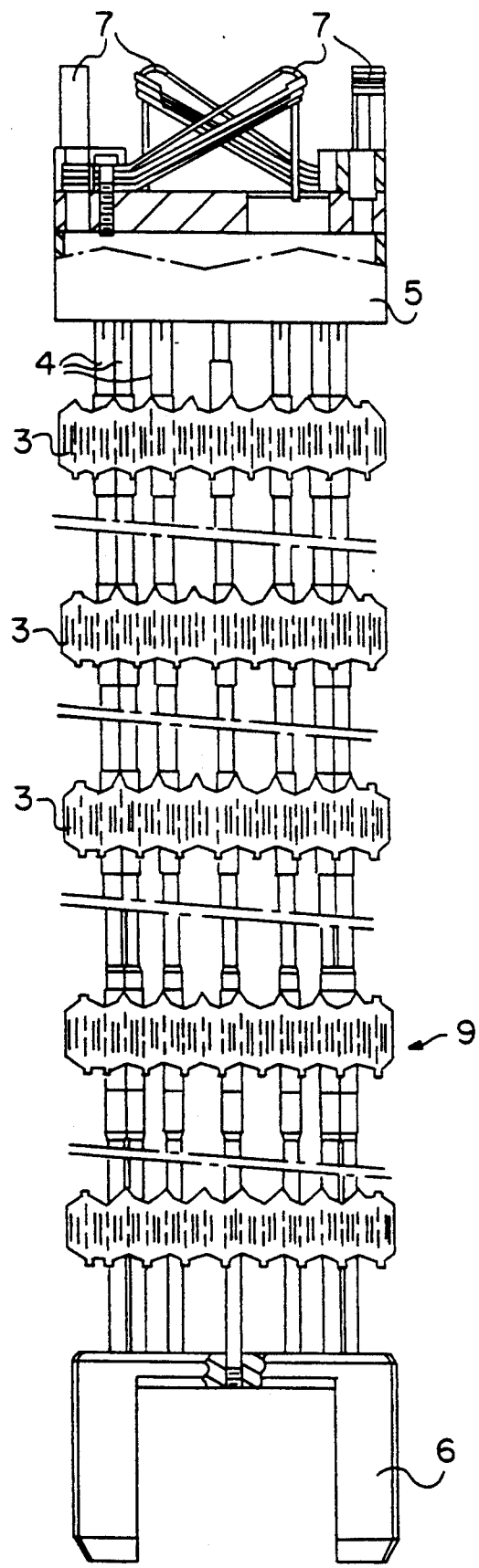
FIG. 2 is an elevation view of the framework of the assembly shown in FIG. 1.

FIG. 2 shows the framework 9 of the fuel assembly comprising guide tubes 4, struts 3 and the end blocks 5 and 6. This framework 9 serves as a housing for the fuel rods 2 of the bundle which may be introduced or extracted from the structure when the top end block 5 is removed. In order to effect replacement or removal of rods, demountable connections between the end of the guide tubes 4 and the top end block 5 are provided.

Figure 3:
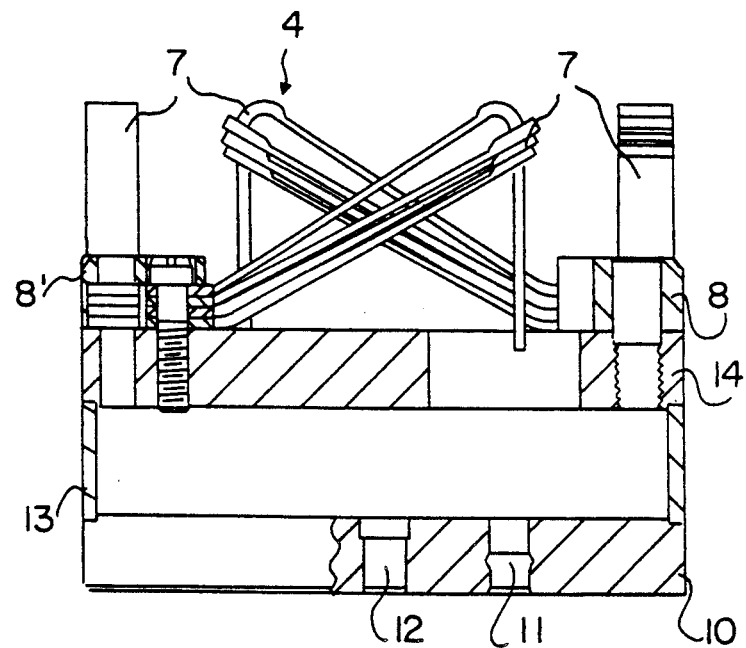
FIG. 3 is a partially sectioned elevation view of the top end block of the fuel assembly.
Figure 4:
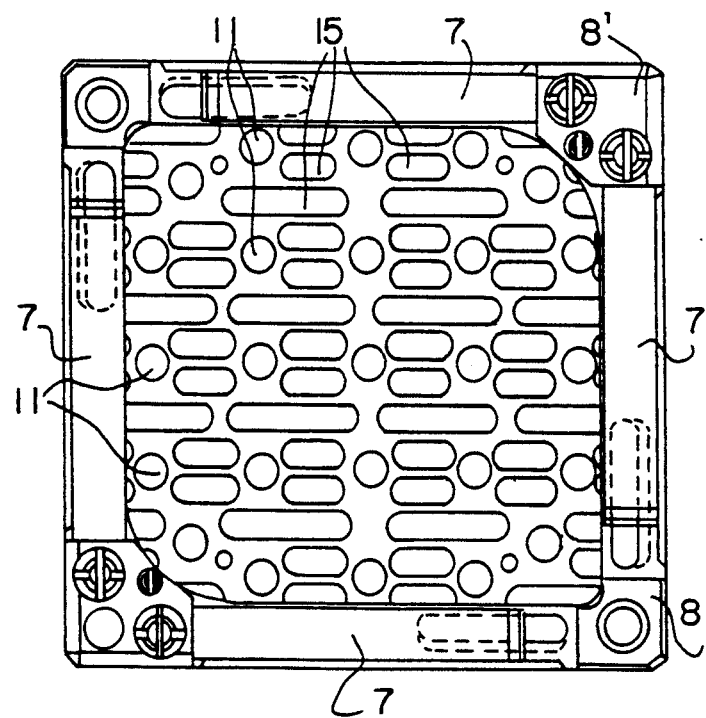
FIG. 4 is a plan view in of direction of 4 of the top end block shown in FIG. 3.

FIGS. 3 and 4 show a top end block of a fuel assembly comprising an adapter plate 10 into which the guide tubes engage, inside openings 11 passing through this adapter plate and accessible from the top part of the fuel assembly. The instrumentation guide tube of the fuel assembly situated in the central part is received inside an opening 12 having a special shape. The top end block of the assembly consists of the adapter plate 10 and a frame 14 connected together by means of a skirt 13 welded onto the plate 10 and onto the frame 14. The frame 14 has bosses 8 comprising centering openings and flanges 8' for holding the springs 7.

As can be seen in FIG. 4, the through-holes 11 allowing fixing of the guide tubes 4 are arranged in defined positions corresponding to the positions of the twenty-four guide tubes of the assembly. Water flow holes 15 pass through the adapter plate 10 of the end block between the through-openings 11 of the guide tubes.

Figure 5:
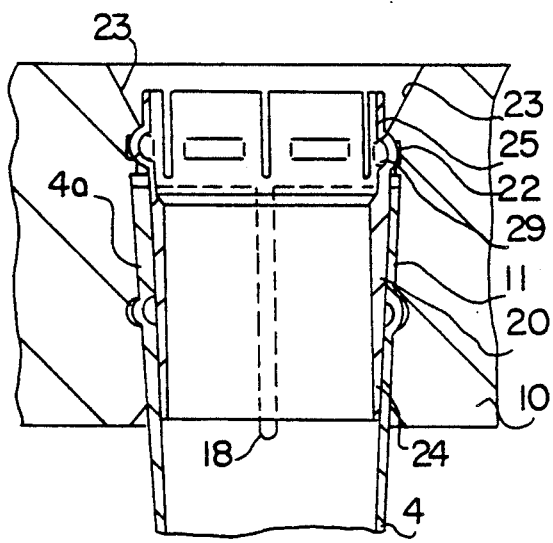
FIG. 5 is an axially sectioned view of the end of a guide tube of a demountable fuel assembly according to the invention, in which a locking sleeve is located in the locked position inside the adapter plate of the assembly.
Figure 6:
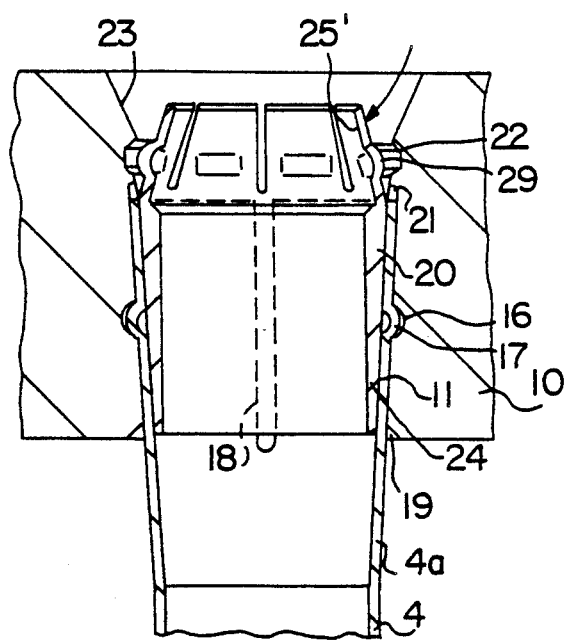
FIG. 6 is an axially sectioned view of the end of the guide tube shown in FIG. 5, the locking sleeve of which is in the unlocked position allowing extraction thereof.

As can be seen in FIGS. 5 and 6, the upper part 4a of the tube 4 has a frusto-conical shape, widening out upwards, corresponding to the shape of the lower part of the through-hole 11 receiving the end of the tube 4.

The upper part 4a of the tube 4 moreover comprises two slits such as the slit 18 arranged in the direction of the generatrices of the trunk of the cone and in diametrically opposite positions. These two slits such as the slit 18 define the frusto-conical segments in the upper part 4a of the guide tube 4, which thus possesses a certain freedom of radial deformation. In the upper part 4a of the guide tube 4, there is provided, on the other hand, on each of the radially deformable segments, a part 17 projecting outwards in the form of a ring portion which is accommodated, when the guide tube 4 is arranged in position inside the opening 11 of the adapter plate 10, inside an annular enlargement 16 of the hole 11. Radial expansion of the upper part 4a of the tube 4 is ensured by a locking sleeve 20. The tube 4 is thus secured and fixed inside the adapter plate 10 and the demountable end block 5.

The part of the through-opening 11 of frusto-conical shape receiving the guide tube 4 and comprising the annular enlargement 16 has a inlet part 19 which widens out, facilitating introduction of the tube 4, and ending in a shoulder 21.

The part 17 of the tube 4 with an annular shape and projecting outwards is preformed before introduction of the tube inside the opening 11 and owing to the elasticity of the frusto-conical segments, allows the tube 4 to be axially locked inside the annular cavity 16. It should be noted that the upper part of the tube 4 does not come into abutment against the shoulder 21 in its engaged position inside the adapter plate. As a result of this arrangement, locating is made easier and positioning of the guide tube 4 in the adapter plate 10 is improved.

The part of the opening 11 situated above the shoulder 21 comprises cavities 22 in the form of ring portions machined in the radial direction inside the adapter plate 10.

Above the cavities 22, the opening 11 comprises a frusto-conical part 23 widening out upwards and emerging on the upper surface of the adapter plate 10.

Figure 7:
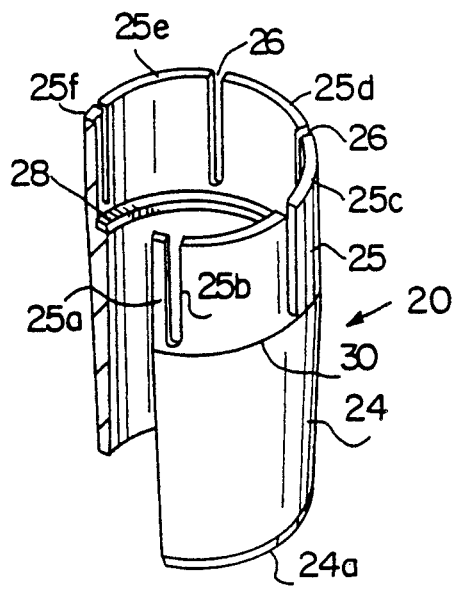
FIG. 7 is a perspective cut-away view of a locking sleeve of a demountable assembly according to the invention, before it is introduced in the locked position inside a guide tube.

FIG. 7 shows a locking sleeve 20 of a guide tube such as shown in FIGS. 5 and 6, which comprises a lower part 24 consisting of a ferrule which is frusto-conical in shape and an upper part 25 consisting of a ferrule which shape.

The frusto-conical ferrule 24 which has at its bottom end an engaging surface 24a is intended to assume a locked position inside the end 4a of the guide tube 4, as shown in FIGS. 5 and 6. The ferrule 24 ensures radial expansion of the frusto-conical segments forming the upper part 4a of the guide tube 4 and retention of the projections 17 inside the annular enlargement 16 of the hole 11.

The upper ferrule 25 forms the fixing ferrule of the locking sleeve which is accommodated in the upper part of the hole 11 of the adapter plate 10, when the sleeve 20 is in the locked position as shown in FIGS. 5 and 6.

According to the invention, the ferrule 25 consists of six successive cylindrical segments 25a, 25b, 25c, 25d, 25e and 25f separated by slits 26 machined in the direction of the generatrices of the ferrule 25, equally spaced and hence situated at 60° from one another about the axis of symmetry of the ferrule 25.

Furthermore, the ferrule 25 has a thickness substantially smaller than the thickness of the frusto-conical ferrule 24, in its upper part, in the vicinity of its large base. A shoulder 28 ensures the separation, on the inside of the locking sleeve 20, between the cylindrical ferrule 25 of limited thickness and the frusto-conical ferrule 24.

The internal surface of the frusto-conical ferrule 24 is substantially cylindrical, such that the thickness of this ferrule decreases from its upper part to its lower part, at the level of which the engaging surface 24a forms a bevel reducing suddenly the thickness of the ferrule.

The frusto-conical ferrule 24, which is relatively thick, has a good degree of rigidity enabling the tube 4 to be effectively held inside the plate. The forced engagement of the frusto-conical ferrule 24 inside the upper part 4a of the tube 4 may be achieved by means of a pushing force on the internal annular shoulder 28 using a tool introduced inside the ferrule 25.

After arranging the locking sleeve in position, fixing thereof may be achieved by deformation of each of its cylindrical segments 25a, 25b, ... 25f of relatively limited thickness inside a cavity 22 of the adapter plate 10.

The radial deformations 29 of the cylindrical segments inside the cavities 22 enable the sleeve 20 to be axially fixed inside the adapter plate. Moreover, in the case where discontinuous cavities 22 in the form of ring portions are machined in the hole 11 of the adapter plate, rotational locking of the sleeve 20 is also achieved.

In the case of the locking sleeve 20 shown in FIG. 7, it is possible to machine six cavities 22 arranged at 60° around the axis of the hole 11.

Very effective fixing of the locking sleeve 20 is thus obtained, by means of the ferrule 25 in several parts.

Moreover, the cylindrical segments 25a to 25f of relatively limited thickness may be folded inwards around the joining line 30 between the cylindrical part and the frusto-conical part of the sleeve 20. The fixing ferrule 25 thus passes from its configuration shown in FIG. 5 to its folded configuration 25' shown in FIG. 6. In the folded position 25' of the cylindrical segments, the parts projecting radially outwards 29 are located outside the cavities 22 such that the sleeve 20 is no longer retained inside the guiding tube 4 and inside the hole 11 by the fixing ferrule 25. It is thus possible for the locking sleeve 20 to be extracted without exerting a significant pulling force on this sleeve.

Folding of the cylindrical segments may be easily performed introducing a suitably shaped tool inside the frusto-conical opening 23, around the top part of the cylindrical segments.

The sleeve for locking the assembly guide tubes according to the invention therefore enables the guide tube to be held very effectively and may be extracted very easily when the top end block of the assembly is demounted.

The invention is not limited to the embodiment which has been described.

Thus, the lower part of the locking sleeve forming a tube expansion bush may have a cylindrical shape instead of a frusto-conical shape, in the case where the tube and the inlet part of the through-hole 11 themselves have a cylindrical shape.

The cylindrical segments forming the fixing ferrule 25 may consist of any number, for example four or eight segments. The number of segments may be limited to two by providing slits sufficiently wide to allow folding down of the segments inwards. These segments may be of the same size or of different sizes. The deformations ensuring fixing of the locking sleeve may be formed solely on certain cylindrical blocks or on all these segments.

The corresponding cavities provided in the opening of the adapter plate may be discontinuous or consist of a simple continuous annular groove.

It is also possible to provide any shape for the part of the hole passing through the adapter plate in order to allow introduction of a tool ensuring folding of the cylindrical segments.

Finally, the invention applies to any demountable fuel assembly for a light-water nuclear reactor.

I claim:

1. A demountable fuel assembly for a nuclear reactor cooled by light water comprising a bundle of parallel fuel rods held inside a framework (9) formed by guide tubes (4), struts (3) and end blocks (5, 6) fixed onto the ends of the guide tubes (4), at least one of the end blocks (5) being fixed onto one of the ends of each of the guide tubes (4) in a demountable manner, by means of an end part (4a) of the guide tube (4) deformable radially and having a securing part (17) projecting radially outwards, engaged inside and over a part of the length of a hole (11) passing through the end block (5) and comprising, in its part receiving the guide tube (4), an annular enlargement (16) intended to receive the securing part (17) of the guide tube (4), radial expansion of the end of the guide tube (4) and holding of its securing part (17) inside the annular enlargement (16) of the hole (11) of the end block (5) being ensured by a locking sleeve (20) comprising a bush (24) for expanding the guide tube (4) and a ferrule (25) for fixing in the end block (5) projecting at the end of the guide tube (4) in the locked position of the sleeve (20), inside the part of the hole (11) of the end block (5) not receiving the guide tube (4), which comprises at least one radial cavity (22) inside which the fixing ferrule (25) is deformed so as to ensure fixing of the locking sleeve (20), wherein the fixing ferrule (25) consists of at least two cylindrical segments (25a, 25b, 25f) separated from one another by at least two slits (26) arranged in the direction of the generatrices of the fixing ferrule (25) and w-herein the hole (11) passing through the end block (5) comprises at least one radial cavity (22) coinciding with at least one of the cylindrical segments (25a, ... 25f), in the locked position of the sleeve (20).

2. The fuel assembly as claimed in claim 1, wherein the expansion bush (24) of the locking sleeve (20) has a frusto-conical shape.

3. The fuel assembly as claimed in claim 1 wherein, the fixing ferrule (25) has a thickness substantially less than the thickness of the expansion part (24) of the sleeve (20), the cylindrical segments (25a, ... 25f) forming the ferrule (25) being thus deformable inside the cavities (22) and being capable of being folded easily towards the inside so as to disengage the deformed parts (29) from the cavities (22), before extracting the locking sleeve (20) from the guide tube (4).

4. The fuel assembly as claimed in claim 1 wherein the fixing ferrule (25) consists of six identical cylindrical segments (25a, ... 25f).

5. The fuel assembly as claimed in claim 1 wherein, wherein the locking sleeve (20) comprises, on the inside, in the zone where the fixing sleeve (25) and the expansion bush (24) are joined, an annular shoulder (28) projecting inwards in the radial direction, allowing a pushing force to be exerted on the locking sleeve (20) so as to engage it inside the guide tube (4).

6. The fuel assembly as claimed in claim 1, wherein the hole (11) passing through an adapter plate (10) of the end block (5) comprises an end part (23) emerging on an outlet side of the adapter plate opposite to an inlet side through which the guide tube (4) penetrates, of frusto-conical shape and widening out in the direction of the outlet side of the adapter plate, so as to allow the insertion of a tool for folding the cylindrical segments of the fixing ferrule (25).

* * * * *